United States Patent [19]
Nishimura et al.

[11] Patent Number: 6,105,930
[45] Date of Patent: Aug. 22, 2000

[54] FLUID CONTROLLER WITH PIVOTING VALVE STEM OPERATOR

[75] Inventors: Ryutaro Nishimura; Takashi Hirose, both of Osaka, Japan

[73] Assignee: Fujikin Incorporated, Osaka, Japan

[21] Appl. No.: 09/325,846

[22] Filed: Jun. 4, 1999

[30] Foreign Application Priority Data

Jun. 8, 1998 [JP] Japan .................................. 10-158904

[51] Int. Cl.⁷ ......................... F16K 35/02; F16K 31/524
[52] U.S. Cl. ......................... 251/102; 251/98; 251/110; 251/263
[58] Field of Search ................. 251/96, 97, 98, 251/104, 108, 110, 94, 95, 107, 102, 101, 263, 262, 251, 279, 229

[56] References Cited

U.S. PATENT DOCUMENTS

| | | | |
|---|---|---|---|
| 3,001,417 | 9/1961 | Becker et al. | 251/98 |
| 3,419,246 | 12/1968 | Burgess | 251/263 |
| 3,656,709 | 4/1972 | Shufflebarger et al. | 251/263 |
| 3,782,413 | 1/1974 | Chacko | 251/74 |
| 3,945,690 | 3/1976 | Masuda et al. | 303/22.1 |
| 4,782,856 | 11/1988 | Siedhoff | 137/556 |
| 5,215,120 | 6/1993 | Nimberger et al. | 251/158 |

FOREIGN PATENT DOCUMENTS 0 247 347 A1  12/1987  European Pat. Off. .
459054  12/1936  United Kingdom .

OTHER PUBLICATIONS

European Search Report dated Dec. 14, 1999.

*Primary Examiner*—Kevin Shaver
*Assistant Examiner*—Eric Keasel
*Attorney, Agent, or Firm*—Armstrong, Westerman, Hattori, McLeland & Naughton

[57] ABSTRACT

A fluid controller comprises a pivotal member pivotally movable about the axis of a horizontal pin, a pair of rollable rollers rotatably supported by the lower end of the pivotal member and having an axis in parallel to the axis of the horizontal pin, a slope provided by the upper surface of a bonnet for allowing each roller to roll therealong in a plane orthogonal to the axis of the roller, and a stopper supported by the pivotal member so as to be movable between a position to engage with a valve stem and a position to be out of engagement therewith. The pivotal member is pivotally moved to roll the rollers along the slope and move the roller-supporting pivotal member upward or downward with the rolling movement, whereby the horizontal pin is raised or lowered.

22 Claims, 7 Drawing Sheets

FLUID CONTROLLER WITH PIVOTING VALVE STEM OPERATOR

BACKGROUND OF THE INVENTION

The present invention relates to fluid controllers wherein a vertical valve stem having an upper end projecting upward from the upper surface of a bonnet is provided with a horizontal pin extending through the upper end, and is movable upward or downward with the upward or downward movement of the horizontal pin to open or close a fluid channel.

Figure 9:
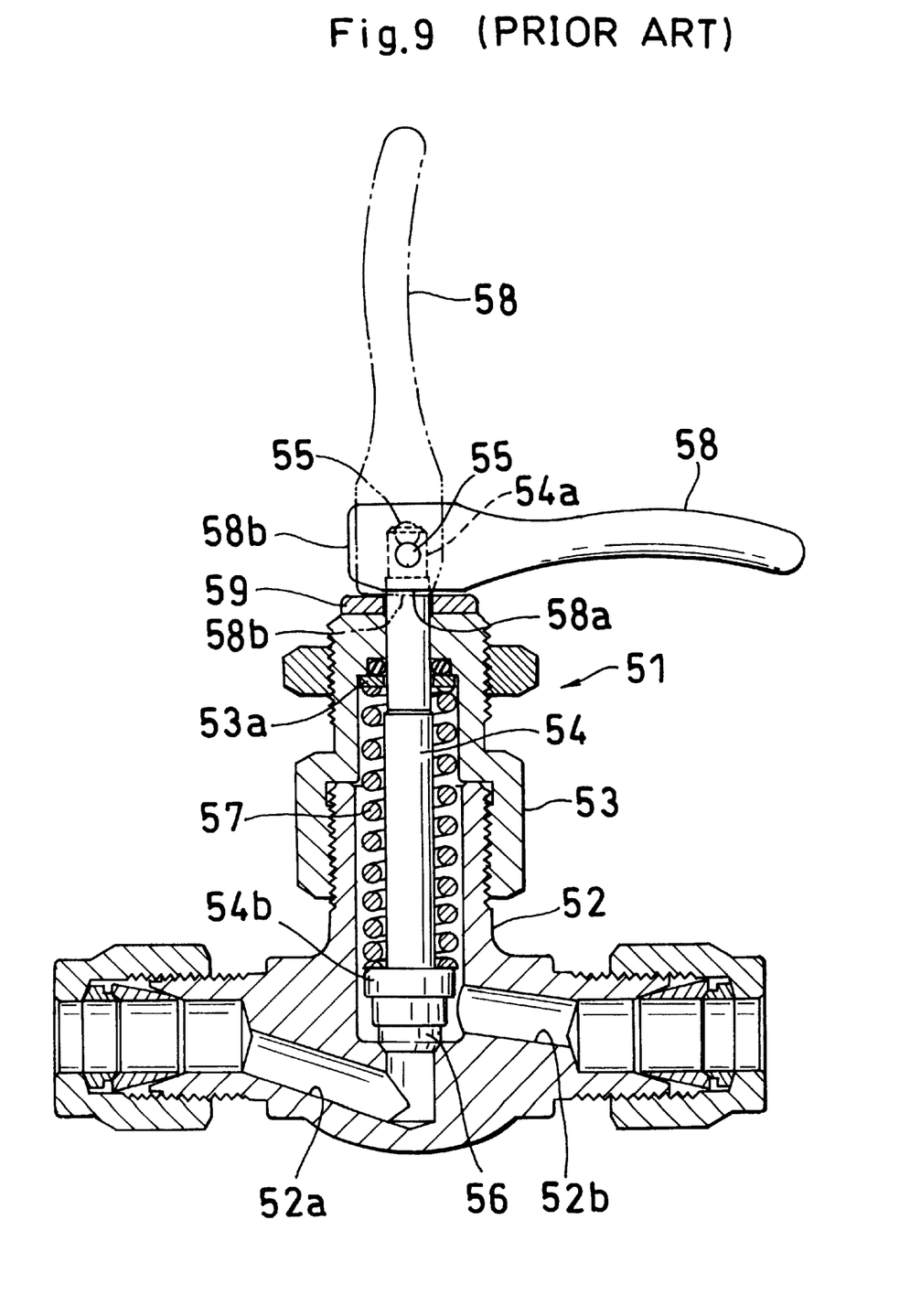
FIG. 9 is a view in vertical section showing a conventional fluid controller.

FIG. 9 shows such a fluid controller already known. The illustrated fluid controller 51, which is termed a toggle valve, comprises a valve body 52 having a fluid inlet channel 52a facing leftward and a fluid outlet channel 52b facing rightward, a tubular bonnet 53 attached to the upper portion of the valve body 52, a valve stem 54 disposed inside the valve body 52 and the bonnet 53 upwardly and downwardly movably and having an upper end 54a projecting upward from the bonnet 53, a valve disk 56 provided at the lower end of the valve stem 54 for opening or closing the fluid inlet channel 52a with the upward or downward movement of the valve stem 54, a compression coil spring 57 bearing against an outer flange 5b formed on the valve stem 54 close to its lower end and an annular spring retainer 53a provided on the inner periphery of an upper end portion of the bonnet 53 for biasing the valve stem 54 downward, a horizontal pin drive lever 58 having the horizontal pin 55 extending through a base end thereof and pivotally movable about the axis of the pin 55 to a horizontal position (shown in a solid line) or alternatively to a vertical position (shown in a chain line), and an annular lever seat 59 provided on the upper end of the bonnet 53 for the drive lever 58 to bear on. The drive lever 58 has faces 58a, 58b to be in bearing contact with the lever seat 59 which faces are at different distances from the axis of the horizontal pin 55 to move the pin 55 upward or downward.

Stated more specifically, the first bearing face 58a of the drive lever 58 in parallel to the longitudinal direction of the lever is in contact with the lever seat 59 when the drive lever 58 is in the horizontal position indicated in the solid line in the drawing. The second bearing face 58b of the drive lever 58 perpendicular to the longitudinal direction of the lever is in contact with the lever seat 59 when the drive lever 58 is in the vertical position indicated in the chain line in the drawing. The distance from the second bearing face 58b to the axis of the horizontal pin 55 is greater than the distance from the first bearing face 58a to the pin axis, such that the distance between the axis of the pin 55 and the portion of the drive lever 58 in bearing contact with the seat 59 is increased by pivotally moving the drive lever 58 from the horizontal position to the vertical position. This upward movement of the horizontal pin 55 raises the valve stem 54 to open the fluid channel 52a.

With the conventional fluid controller described, the horizontal pin drive lever needs to be pivotally moved to the horizontal position or vertical position against the force of sliding friction between the drive lever and the lever seat. The pivotal movement requires great torque, which is likely to give pain to the hand when the lever is moved to open or close the fluid channel. The sliding friction causes wear on the bearing face of the drive lever in contact with the lever seat, entailing the problem of failing to ensure the full open or closed state. The movement of the drive lever to the horizontal position requires a great space, giving rise to the problem of necessitating an increased space when a plurality of controllers are to be installed.

SUMMARY OF THE INVENTION

An object of the present invention is to provide a fluid controller by which a fluid channel can be opened or closed without necessitating a great force and without entailing wear due to a frictional force, and which can be installed in a diminished space when a plurality of controllers are to be used.

Another object of the invention is to provide a fluid controller equipped with a lock mechanism for holding the fluid channel fully open or closed with high reliability.

The present invention provides a fluid controller wherein a vertical valve stem having an upper end projecting upward from an upper surface of a bonnet is provided with a horizontal pin extending through the upper end, and the valve stem is movable to a lower position to hold a fluid channel closed by being biased downward by an elastic member or alternatively to a higher position to hold the fluid channel open by moving the horizontal pin upward, the fluid controller being characterized in that a horizontal pin drive device for moving the horizontal pin upward or downward comprises a pivotal member pivotally movable about an axis of the horizontal pin, a rollable roller rotatably supported by a lower end of the pivotal member and having an axis parallel to the axis of the horizontal pin, and a slope provided by the upper surface of the bonnet for allowing the roller to roll therealong in a plane orthogonal to the axis thereof, the pivotal member being pivotally movable to roll the roller along the slope and move the roller-supporting pivotal member upward or downward with the rolling movement, whereby the horizontal pin is moved upward or downward.

When the pivotal member is pivotally moved by hand, the roller rolls along the slope, and the rolling movement moves the pivotal member upward or downward, whereby horizontal pin is raised or lowered. As a result, the valve stem moves upward or downward to open or close the fluid channel. Unlike the conventional drive lever which is pivotally moved against sliding friction, the pivotal member is merely moved pivotally against rolling friction, so that the fluid channel can be opened or closed without necessitating a great force and without the likelihood of causing wear on the portion where sliding friction occurs. Since the pivotal member need not be moved to a horizontal position when causing the roller to roll along the slope, the space necessary for installing a plurality of controllers can be smaller than is required conventionally.

Preferably, the fluid controller further comprises a lock device provided between the drive device and the valve stem for locking the valve stem in one of the lower position for holding the fluid channel closed and the upper position for holding the fluid channel open. The valve stem can then be locked in position to hold the fluid channel closed or, alternatively to hold the channel open and is prevented from moving inadvertently, consequently assuring the fluid channel of the fully opened or closed state.

The pivotal member may comprise a roller support portion having the horizontal pin extending therethrough and disposed inside a cover covering the upper end of the valve stem, and a handle projecting upward from the cover through a hole formed in a top portion of the cover. The roller supported by the roller support portion can then be disposed inside the cover and protected.

The lock device comprises, for example, a stopper supported by the pivotal member so as to be movable between a position where the stopper engages with the valve stem and a position where the stopper is out of engagement therewith, a compression coil spring for biasing the stopper into engagement with the valve stem, a pair of left and right locking cavities formed in an upper end face of the valve stem for fitting in a lower end of the stopper, and a locking-unlocking knob attached to an upper end of the stopper. Alternatively, the lock device comprises a stopper supported by the pivotal member so as to be movable between a position where the stopper engages with the valve stem and a position where the stopper is out of engagement therewith, an engagement plate provided at an upper end of the valve stem, a pair of left and right locking cavities formed in an upper portion of the engagement plate for fitting in a lower end of the stopper, and a locking-unlocking knob attached to an upper end of the stopper. The valve stem can then be locked in position for holding the fluid channel closed or open by engaging the stopper in the corresponding one of the locking cavities. The stopper is biased by the elastic member into engagement with the valve stem and can therefore be held locked at this time. The valve stem can be unlocked by moving the stopper against the biasing force of the elastic member. Thus, the fluid channel can be held closed or alternatively held open by a very simple procedure.

More specifically, the lock device has the following construction. The stopper is slidably inserted through a stopper guide bore formed in the pivotal member and rotatable about an axis of the stopper, the pivotal member being formed in an upper end face of a handle thereof with a locking groove extending laterally and great in width and depth, and an unlocking groove positioned at front and rear sides of the groove to extend across the groove and small in width and depth, the knob being provided on a bottom face thereof with a pair of left and right downward protrusions so positioned as to hold the upper end of the handle therebetween in a locking state, the knob having a lower half thereof positioned in the locking groove in the handle of the pivotal member when the stopper lower end is fitted in the locking cavity in the locking state, the downward protrusions of the knob being fittable into the unlocking groove in the handle when the knob in the locking state is pulled up and turned through 90 deg to raise the knob relative to the pivotal member by an amount corresponding to the difference in depth between the locking groove and the unlocking groove plus the amount of projection of the downward protrusions and to thereby move the stopper lower end out of the locking cavity, whereby the pivotal member is unlocked and made pivotally movable. The valve stem can then be changed over easily from one locking position to the other locking position to hold the fluid channel closed or open, while a locking-unlocking change can be effected with extreme ease by moving the knob upward and downward and turning the knob.

The engagement plate may have inserted therethrough the horizontal pin extending through the valve stem upper end and is thereby made movable with the valve stem upward or downward, with the locking cavities formed in the plate.

DESCRIPTION OF THE PREFERRED EMBODIMENTS

Embodiments of the invention will be described below with reference to the drawings. FIGS. 1 to 5 show a first embodiment, and FIGS. 6 to 8 a second embodiment. The terms "upper," "lower," "left" and "right" used herein refer respectively to the upper and lower sides and the left-hand and right-hand sides of FIG. 1. The terms "front" and "rear" refer to the front side of the plane of FIG. 1 and the rear side thereof, respectively.

Figure 1:
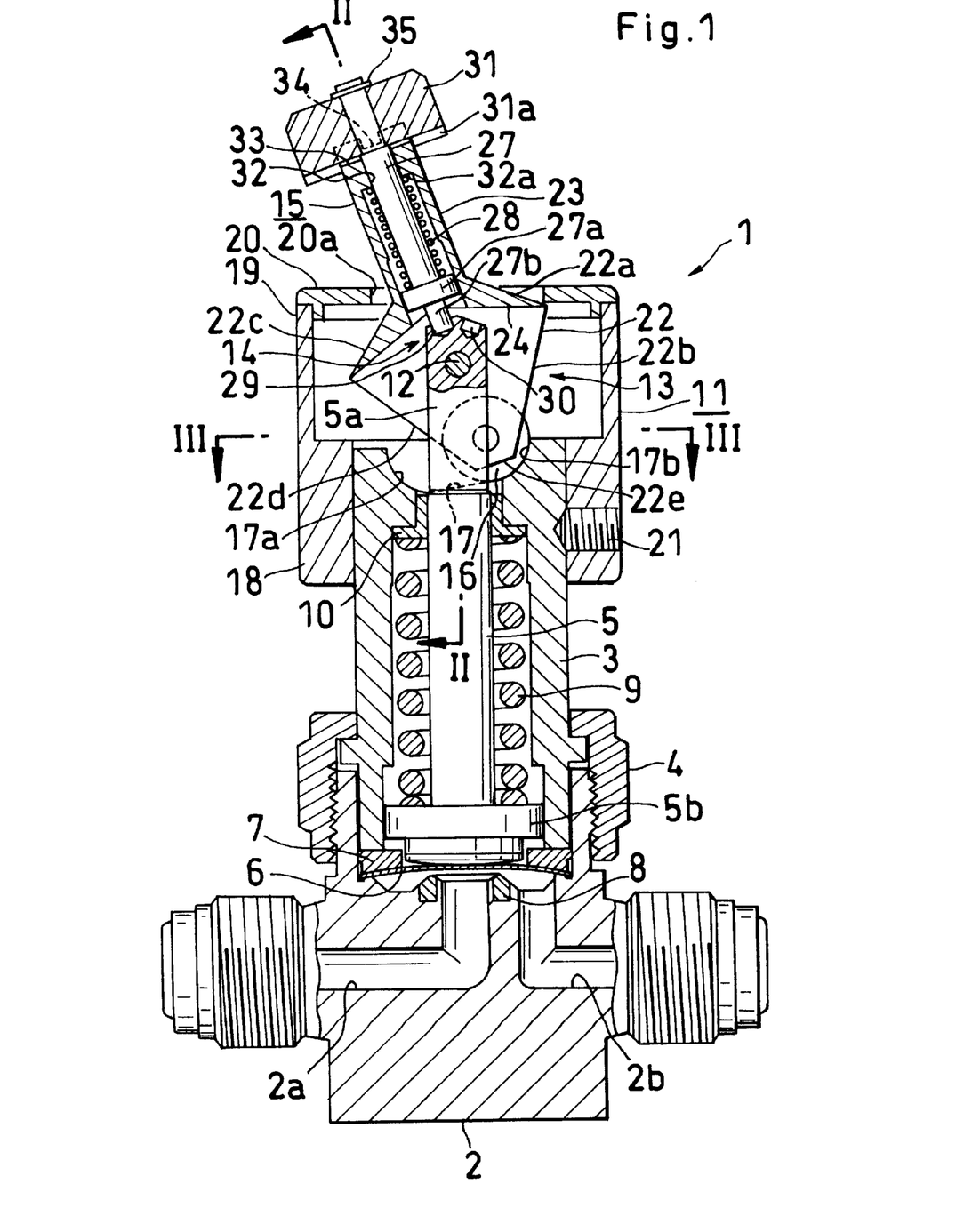
FIG. 1 is a view in vertical section showing a first embodiment of fluid controller of the invention with a fluid channel held open.

FIG. 1 shows a fluid controller 1 of the present invention, which comprises a valve body 2 having a fluid inlet channel 2a facing leftward and a fluid outlet channel 2b facing rightward, a tubular bonnet 3 attached to the upper side of the valve body 2 by a bonnet nut 4, a valve stem 5 disposed inside the bonnet 3 upwardly and downwardly movably and having an upper end 5a projecting upward from the bonnet 3, a diaphragm (valve element) 6 provided at the lower end of the valve stem 5 for opening or closing the fluid inlet channel 2a with the upward or downward movement of the valve stem 5, an annular diaphragm holder 7 attached to the lower end of the bonnet 3 for holding the peripheral portion of the diaphragm 6 between the holder and the valve body 2, a seat 8 provided at an inner peripheral portion of the valve body 6 defining an upward opening of the inlet channel 2a for receiving the diaphragm 6, a compression coil spring 9 housed in the bonnet 3 and bearing against an outer flange 5b formed on the valve stem 5 close to its lower end and an annular spring retainer 10 provided at an upper end portion of the bonnet 3 for biasing the valve stem 5 downward, a cover 11 provided over the upper end 5a of the valve stem 5, a horizontal pin 12 extending through the upper end 5a of the valve stem 5 and movable with the stem 5 upward and downward, a horizontal pin drive device 13, and a lock device 14 provided between the drive device 13 and the valve stem 5 for locking the valve stem 5 in a lower position to hold the fluid channel closed or in an upper position to hold the fluid channel open.

The horizontal pin drive device 13 comprises a pivotal member 15 pivotally movable about the axis of the horizontal pin 12, a pair of front and rear rollable rollers 16 arranged at the lower end of the pivotal member 15, and a rightwardly upward slope 17 provided by the upper surface of the bonnet 3 for the rollers 16 to roll along.

The cover 11 is in the form of a hollow cylinder and comprises a small portion 18 provided around the upper end portion of the bonnet 3, a large portion 19 extending upward from the small portion 18 and having a larger inside diameter than this portion 18, and a top portion 20 provided at the upper end of the large portion 19 and having a rectangular hole 20a. The cover 11 is attached to the upper end portion of the bonnet 3 by a horizontal setscrew 21 screwed through the small portion 18.

The pivotal member 15 comprises a roller support portion 22 generally hexagonal when seen from the front and disposed inside the cover 11, with the horizontal pin 12 extending through the portion 22 centrally thereof, and a handle 23 generally rectangular when seen from the front and projecting upward from the cover 11 through the rectangular hole 20a in the cover top portion 20.

The roller support portion 22 of the pivotal member has an upper rightwardly downward face 22a extending from the right end of the junction of the portion 22 and the handle 23, a lower leftwardly downward face 22b continuous with the lower end of the face 22a, an upper leftwardly downward face 22c extending from the left end of the junction, a lower rightwardly downward face 22d continuous with the lower end of the face 22c, and a lower end face 22e interconnecting the lower ends of the face 22b and the face 22d. The roller support portion 22 is formed with a valve stem accommodating recess 24 so as not to interfere with the valve stem 5 when the pivotal member 15 moves pivotally.

Figure 2:
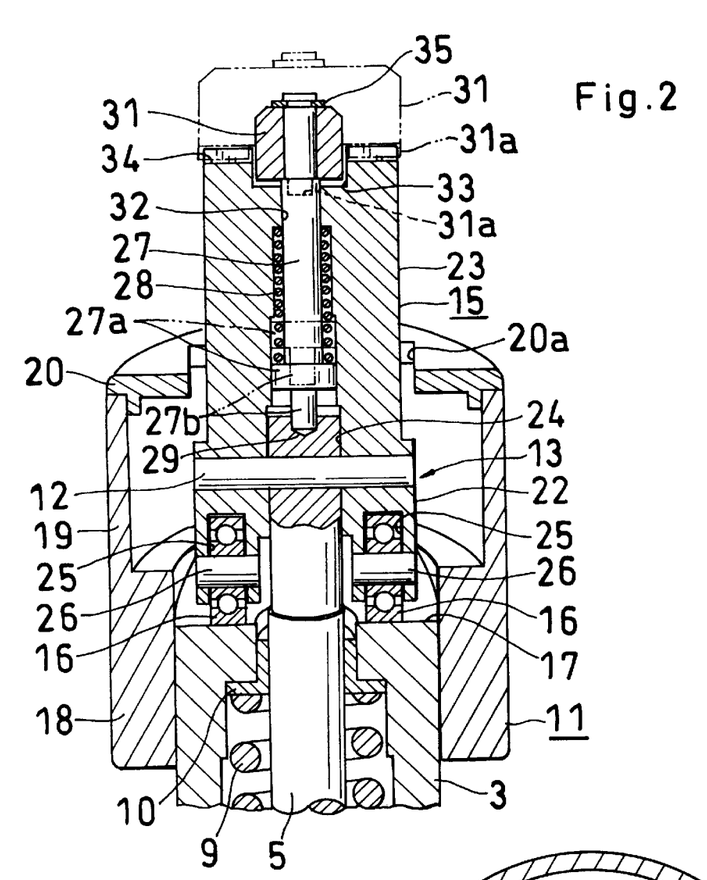
FIG. 2 is a view in section taken along the line II—II in FIG. 1.
Figure 3:
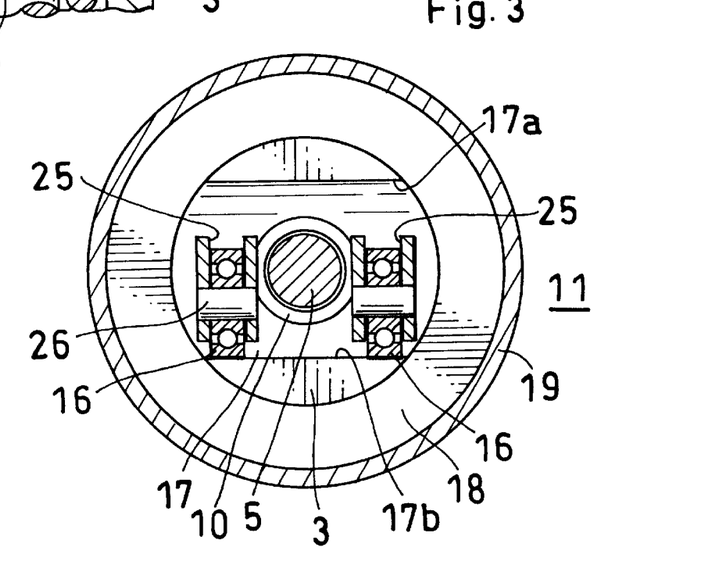
FIG. 3 is a view in section taken along the line III—III in FIG. 1.

As shown in FIGS. 2 and 3, the lower end of the roller support portion 22 of the pivotal member 15 is formed with a pair of front and rear recesses 25 facing downward and having fitted therein the respective front and rear rollers 16. Each roller 16 is supported by a shaft 26 extending through side walls defining the recess 25 and has a lower end projecting downward from the support portion 22 of the pivotal member 15.

The slope 17 provided by the upper surface of the bonnet 3 is inclined at about 10 deg with respect to a horizontal plane. Each roller 16 is rolled along the slope 17 in a plane orthogonal to the axis of the roller 16. Formed at the left end and the right end of the slope 17 are raised portions 17a, 17b which are each in the form of an arc when seen from the front for halting the rollers 16 respectively at the lower-end position and the upper-end position of the slope 17.

The lock device 14 comprises a stopper 27 supported by the pivotal member 15 so as to be movable between a position where the stopper engages with the valve stem 5 and a position where the stopper is out of engagement therewith, a compression coil spring 28 for biasing the stopper 27 into engagement with the valve stem 5, a pair of left and right locking cavities 29, 30 formed in the upper end face of the stem 5 for fitting in the lower end 27b of the stopper 27, and a locking-unlocking knob 31 in the form of a rectangular parallelepipedal block and attached to the upper end of the stopper 27.

Figure 4:
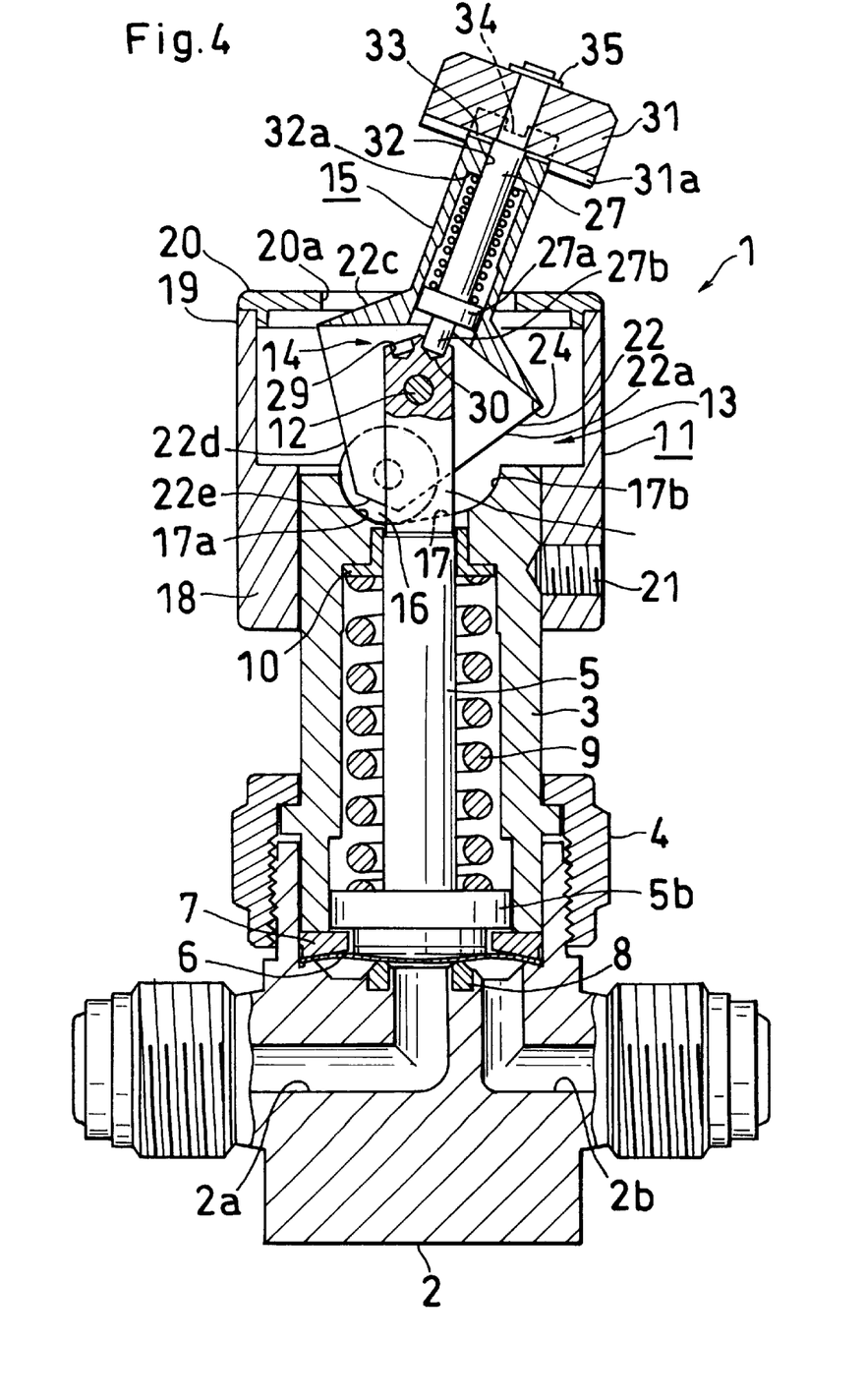
FIG. 4 is a view in vertical section corresponding to FIG. 1 and showing the same with the fluid channel closed.

FIGS. 1 to 3 show the fluid channel as opened, with the valve stem 5 in its upper position. In this state, the downward biasing force exerted by the compression coil spring 9 on the valve stem 5 is in balance with an upward force acting on the horizontal pin 12 through the rollers 16, and the lower end 27b of the stopper 27 is fitted in the left cavity (for locking the valve stem in the channel opening state) 29 of the pair formed in the valve stem upper end face, holding the fluid channel 2a open. FIG. 4 shows the pivotal member 15 as moved from this state to lower the rollers 16. At this time, the valve stem 5 is depressed by the downward biasing force of the spring 9, with the lower end 27b of the stopper 27 engaged in the right cavity (for locking the valve stem in the channel closing state) 30, holding the fluid channel 2a closed with the valve stem 5 in its lower position.

The axis of the horizontal pin 12 and the axis of the shafts 26 of the rollers 16 are positioned on an extension of the axis of the stopper 27. The distance from the knob 31 to the pin 12 is about 2.5 times the distance from the pin 12 to the lower ends of the rollers 16. The angle of pivotal movement of the pivotal member 15 is about ±20 deg with respect to a vertical axis.

The pivotal member 15 has a stopper guide bore 32 having a circular cross section and extending through the handle 23 over the entire length thereof and to an upper end portion of the roller support portion 22. The stopper 27 is slidably inserted through the guide bore 32 and rotatable about its own axis. The stopper 27 has close to its lower end an outer flange 27a for retaining the lower end of a compression coil spring 28 for biasing the stopper. The stopper guide bore 32 has an upper end portion slightly greater than the shank of the stopper 27 in diameter, an intermediate portion slightly smaller than the stopper flange 27a in diameter and a lower end portion slightly greater than the flange 27a in diameter. The coil spring 28 bears against a stepped portion 32a between the upper end portion and the intermediate portion of the guide bore 32 and against the stopper flange 27a.

The handle 23 of the pivotal member 15 has a rectangular cross section which is elongated forward or rearward. Formed in the upper end face of the handle 23 are a locking groove 33 extending laterally (i.e., in the left-to-right direction) and great in width and depth, and an unlocking groove 34 positioned at the front and rear sides of the groove 33 to extend across the groove 33 and small in width and depth.

The upper end of the stopper 27 projects upward from the handle 23 of the pivotal member 15 and extends through the knob 31. A retainer ring 35 is fitted around the upper extremity of the stopper 27 to hold the knob 31 to the stopper 27. Accordingly, the stopper 27 is movable upward axially thereof by pulling up the knob 31 by hand against the force of the coil spring 28. Further when the stopper lower end 27b is not fitted in the locking cavity 29 or 30 formed in the upper end face of the valve stem 5, the stopper 27 is rotatable about its axis by turning the knob 31.

The knob 31 is provided on its bottom face with a pair of left and right downward protrusions 31a which are so positioned as to hold the upper end of the handle 23 therebetween when the valve stem is locked to hold the fluid channel open as shown in FIG. 1. In this state wherein the stopper lower end 27b is fitted in the locking cavity 29, the lower half of the knob 31 is positioned in the locking groove 33 in the handle 23 of the pivotal member 15 as indicated in a solid line in FIG. 2. When the knob 31 in this state is pulled up and turned through 90 deg, the downward protrusions 31a of the knob 31 fit into the unlocking groove 34 in the handle 23 as indicated in a broken line in FIG. 2, whereby the knob 31 is raised relative to the pivotal member 15 by an amount corresponding to the difference in depth between the locking groove 33 and the unlocking groove 34 plus the amount of projection of the downward protrusions 31a, moving the stopper lower end 27b out of the locking cavity 29 and rendering the pivotal member 15 movable in an unlocked state.

When the pivotal member 15 is pivotally moved in this unlocked state, the rollers 16 roll down the slope 17, permitting the compression coil spring 9 acting on the valve stem 5 to depress the stem 5 with its downward biasing force. Consequently, the valve stem 5 moves downward to close the fluid channel 2a. The knob 31 is then turned through 90 deg and thereafter released from the hand, whereby the fluid channel is held closed as shown in FIG. 4. In such a procedure, the pivotal member 15 is merely moved pivotally against the rolling friction between the rollers 16 and the slope 17, so that the fluid channel can be opened or closed without necessitating a great force and without the likelihood of causing wear on the portion where sliding friction occurs. Since the space necessary for moving the pivotal member 15 is not greater than the space occupied by the valve body 2 laterally thereof, the space needed for installing a plurality of controllers 1 can be diminished. Furthermore, the valve stem can be locked in position for holding the fluid channel closed or open merely by moving the knob 31 upward and downward and turning the knob, hence extreme ease.

Figure 5:
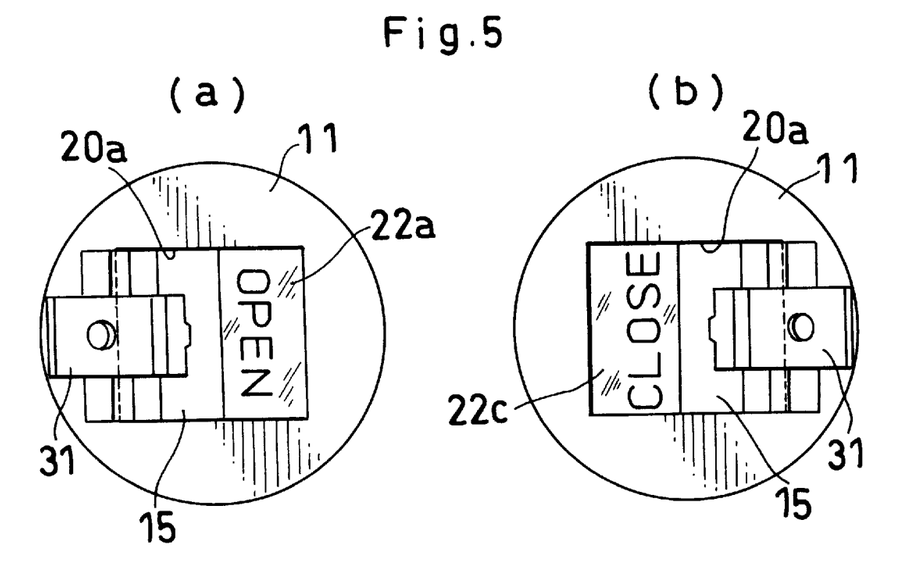
FIG. 5 includes plan views showing the same in the fluid channel opened state (a) and in the fluid channel closed state (b)

FIG. 5 shows that the term "OPEN" indicating the open state of the channel is marked on the upper rightwardly downward face 22a of the roller support portion 22 of the pivotal member 15 which face can be seen through the hole 20a of the cover 11 in the state shown in FIG. 1. The term "CLOSE" indicating the closed state of the channel is marked on the upper leftwardly downward face 22c which can be seen through the cover hole 20a in the state shown in FIG. 4.

The construction of the first embodiment described can be modified variously with respect to the upper end 5a of the valve stem 5, cover 11, pivotal member 15 and stopper 27, for example, as will be described below with reference to FIGS. 6 to 8.

Figure 6:
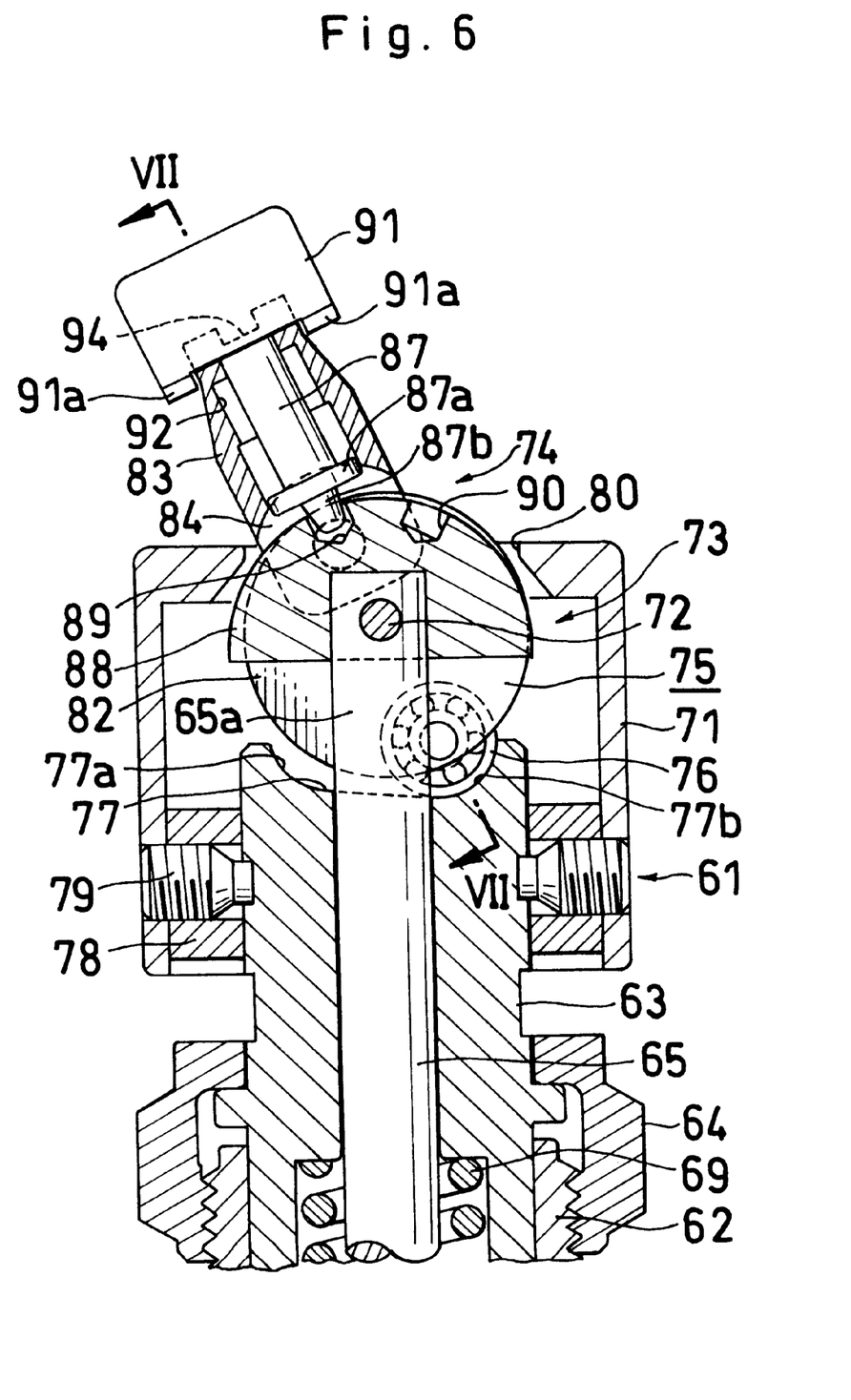
FIG. 6 is a view in vertical section showing a second embodiment of fluid controller of the invention with a fluid channel closed.
Figure 7:
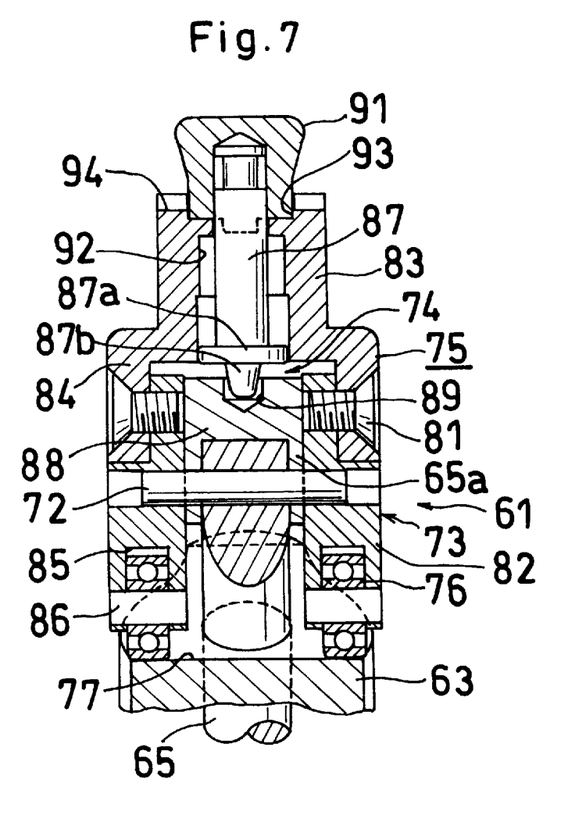
FIG. 7 is a view in section taken along the line VII—VII in FIG. 6.
Figure 8:
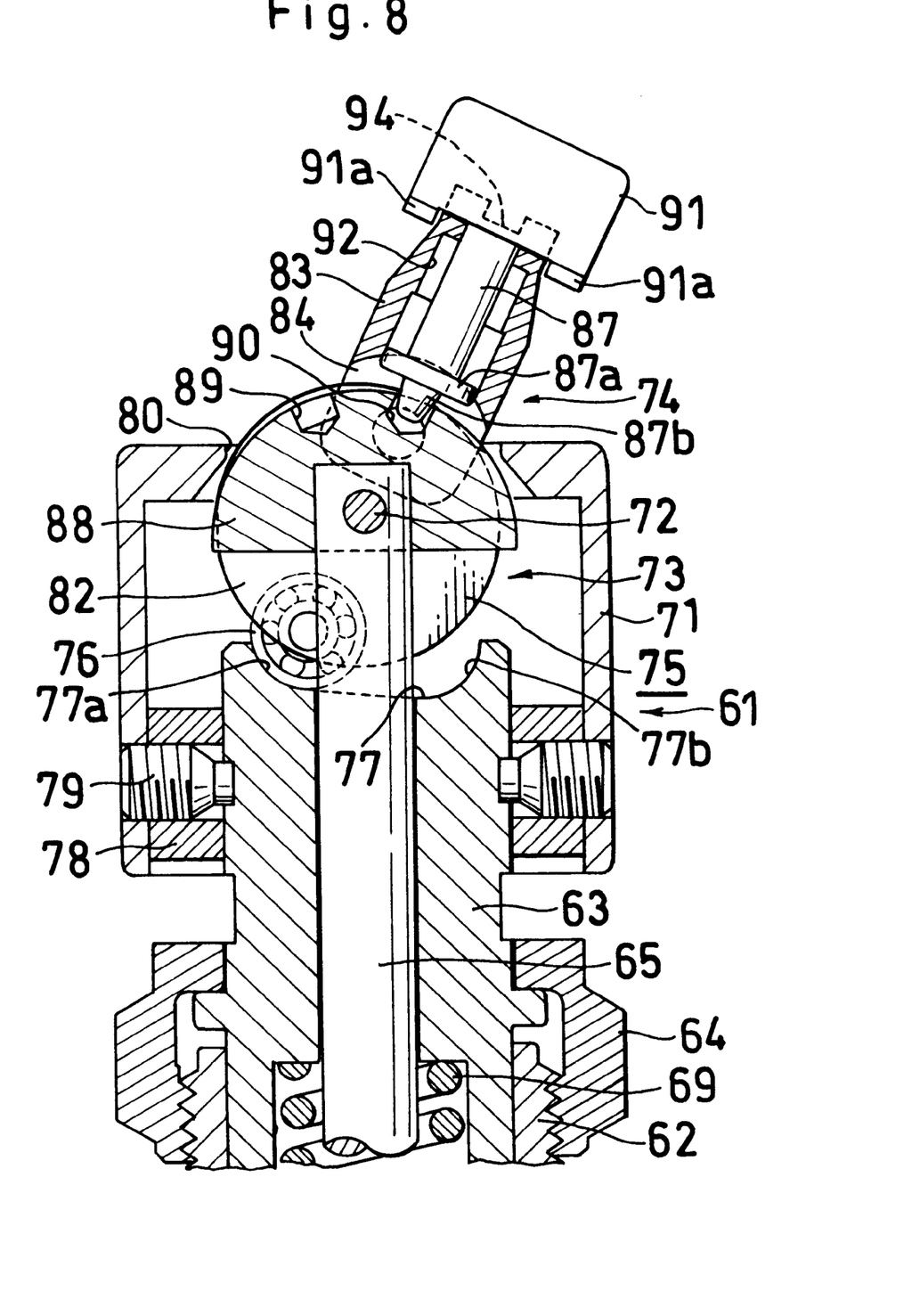
FIG. 8 is a view in vertical section corresponding to FIG. 6 and showing the same with the fluid channel held open.

FIGS. 6 to 8 show a second embodiment of the invention, i.e., fluid controller 61, which comprises a valve body 62 having a fluid channel (not shown), a tubular bonnet 63 attached to the upper side of the valve body 62 by a bonnet nut 64, a valve stem 65 disposed inside the bonnet 63 upwardly and downwardly movably and having an upper end 65a projecting upward from the bonnet 63, a diaphragm (not shown) provided at the lower end of the valve stem 65 for opening or closing the fluid channel with the upward or downward movement of the valve stem 65, a compression coil spring 69 for biasing the valve stem 65 downward, a cover 71 provided over the upper end 65a of the valve stem 65, a horizontal pin 72 extending through the upper end 65a of the valve stem 65 and movable with the stem 65 upward and downward, a horizontal pin drive device 73, and a lock device 74 provided between the drive device 73 and the valve stem 65 for locking the valve stem 65 in a lower position to hold the fluid channel closed or in an upper position to hold the fluid channel open.

The horizontal pin drive device 73 comprises a pivotal member 75 pivotally movable about the axis of the horizontal pin 72, a pair of front and rear rollable rollers 76 arranged at the lower end of the pivotal member 75 and each in the form of an open radial ball bearing, and a rightwardly downward slope 77 provided by the upper surface of the bonnet 63 for the rollers 76 to roll along.

The cover 71 is in the form of a hollow cylinder and is fastened to an upper end portion of the bonnet 65 with horizontal setscrews 79 screwed through the lower portion of the peripheral wall thereof. A spacer 78 is fitted in the peripheral wall lower portion of the cover 71 around the upper end portion of the bonnet 63.

The pivotal member 75 comprises a pair of front and rear roller support portions 82 circular when seen from the front, disposed inside the cover 71 and having the horizontal pin 72 extending therethrough slightly above their centers, a handle 83 generally in the form of a rectangular parallelepiped and projecting upward from the cover 71 through a rectangular hole 80 in the top portion of the cover 71, and a pair of front and rear walls 84 integral with the lower end of the handle 83 for attaching the roller support portions 82 to the handle 83.

As seen in FIG. 7, each roller support portion 82 of the pivotal member 75 is fastened to the corresponding wall 84 with a setscrew 81 inserted through the portion 82 and the wall 84 from outside. The lower ends of the roller support portions 82 of the pivotal member 75 are formed with a pair of front and rear recesses 85, respectively, which face downward and have fitted therein the respective front and rear rollers 76. Each roller 76 is supported by a shaft 86 extending through side walls defining the recess 85 and has a lower end projecting downward from the support portion 82 of the pivotal member 75.

The slope 77 provided by the upper surface of the bonnet 63 is inclined at about 5 deg with respect to a horizontal plane. Each roller 76 is rolled along the slope 77 in a plane orthogonal to the axis of the roller 76. Formed at the left end and the right end of the slope 77 are raised portions 77a, 77b which are each in the form of an arc when seen from the front for halting the rollers 76 respectively at the lower-end position and the upper-end position of the slope 77.

The lock device 74 comprises a stopper 87 supported by the pivotal member 75 so as to be movable between a position where the stopper engages with the valve stem 65 and a position where the stopper is out of engagement therewith, a semicircular engagement plate 88 provided at the upper end 65a of the valve stem 65 with its arc portion facing upward, a pair of left and right locking cavities 89, 90 formed in the upper part of arc portion of the engagement plate 88 for fitting in the lower end 87b of the stopper 87, and a locking-unlocking knob 91 in the form of a rectangular parallelepipedal block and attached to the upper end of the stopper 87.

The engagement plate 88 has inserted therethrough the horizontal pin 72 extending through the valve stem upper end 65a and is thereby made movable with the valve stem 65 upward or downward, and the locking cavities 89, 90 are formed in the engagement plate 88 so as to be positioned at the valve stem upper end 65a.

FIGS. 6 and 7 show the fluid channel as closed, with the valve stem 65 in its lower position. At this time, the valve stem 65 is depressed by the downward biasing force of the compression coil spring 69, with the lower end 87b of the stopper 87 engaged in the left cavity (for locking the valve stem in the channel closing state) 89, holding the fluid channel closed with the valve stem 65 in its lower position. FIG. 8 shows the pivotal member 75 as moved from this state to raise the rollers 76. In this state, the downward biasing force exerted by the spring 69 on the valve stem 65 is in balance with an upward force acting on the horizontal pin 72 through the rollers 76, and the lower end 87b of the stopper 87 is fitted in the right cavity (for locking the valve stem in the channel opening state) 90 of the pair positioned at the valve stem upper end, holding the fluid channel open.

The axis of the horizontal pin 72 and the axis of the shafts 86 of the rollers 76 are positioned on an extension of the axis of the stopper 87. The distance from the knob 91 to the pin 72 is about 2.5 times the distance from the pin 72 to the lower ends of the rollers 76. The angle of pivotal movement of the pivotal member 75 is about ±25 deg with respect to a vertical axis.

The pivotal member 75 has a stopper guide bore 92 having a circular cross section and extending through the handle 83 over the entire length thereof. The stopper 87 is slidably inserted through the guide bore 92 and rotatable about its own axis. The stopper 87 has an outer flange 87a close to its lower end. The stopper guide bore 92 has an upper portion slightly smaller than the stopper flange 87a in diameter and a lower portion slightly greater than the flange 87a in diameter.

Formed in the upper end face of the handle 83 of the pivotal member 75 are a locking groove 93 extending laterally (i.e., in the left-to-right direction) and great in width and depth, and an unlocking groove 94 positioned at the front and rear sides of the groove 93 to extend across the groove 93 and small in width and depth.

The upper end of the stopper 87 projects upward from the handle 83 of the pivotal member 75 and is tightly fitted in a downward cavity of the knob 91. Accordingly, the stopper 87 is movable upward axially thereof by pulling up the knob 91 by hand. Further when the stopper lower end 87b is not fitted in the locking cavity 89 or 90 formed at the upper end of the valve stem 65, the stopper 87 is rotatable about its axis by turning the knob 91.

The knob 91 is provided on its bottom face with a pair of left and right downward protrusions 91a which are so positioned as to hold the upper end of the handle 83 therebetween when the valve stem is locked to hold the fluid channel closed as shown in FIG. 6. In this state wherein the stopper lower end 87b is fitted in the locking cavity 89, the lower half of the knob 91 is positioned in the locking groove 93 in the handle 83 of the pivotal member 75. When the knob 91 in this state is pulled up and turned through 90 deg, the downward protrusions 91a of the knob 91 fit into the unlocking groove 94 in the handle 83, whereby the knob 91 is raised relative to the pivotal member 75 by an amount corresponding to the difference in depth between the locking groove 93 and the unlocking groove 94 plus the amount of projection of the downward protrusions 91a, moving the stopper lower end 87b out of the locking cavity 89 and rendering the pivotal member 75 movable in an unlocked state.

When the fluid controller according to the second embodiment described is manipulated to open or close the fluid channel, the pivotal member 75 is merely moved pivotally against the rolling friction between the rollers 76 and the slope 77, so that the fluid channel can be opened or closed without necessitating a great force and without the likelihood of causing wear on the portion where sliding friction would occur. Since the space necessary for moving the pivotal member 75 is not greater than the space occupied by the valve body 62 laterally thereof, the space needed for installing a plurality of controllers 61 can be diminished. Furthermore, the valve stem can be locked in position very easily for holding the fluid channel closed or open merely by moving the knob 91 upward and downward and turning the knob 91.

Although not shown, the term "CLOSE" indicating the closed state of the channel is marked on a right surface portion of the pivotal member 75 which portion can be seen through the hole 80 of the cover 71 in the state shown in FIG. 6. The term "OPEN" indicating the open state of the channel is marked on a left surface portion of the member 75 which portion can be seen through the cover hole 80 in the state shown in FIG. 8.

According to the first and second embodiments, the valve disk or element of the fluid controller 1 or 61 is not limited to a diaphragm. The horizontal pin drive device 13 and the lock device 14 can be provided insofar as the fluid controller is so adapted that the valve stem 5 is movable upward or downward to open or close the fluid channel and can be locked in a lower position to hold the fluid channel closed or in a higher position to hold the channel open. Instead of fastening the bonnet 3 to the valve body 2 with the nut 4, these two components can be formed integrally.

What is claimed is:

1. A fluid controller comprising:
    a valve body for housing fluid channels, the valve body having,
        a fluid inlet channel, and
        a fluid outlet channel;
    a tubular bonnet with a lower end attached to the valve body and a shaped upper surface;
    a valve stem, having an upper end and a lower end, moveably disposed in the tubular bonnet and associated with the fluid inlet channel and the fluid outlet channel wherein upward and downward movement of the valve stem opens and closes the fluid inlet channel and the fluid outlet channel;
    an elastic member housed in the tubular bonnet for biasing the valve stem;
    a horizontal pin extending through the upper end of the valve stem and movable therewith;
    a horizontal pin drive device pivotally movable about an axis of the horizontal pin, and
    a roller associated with the horizontal pin drive device for rolling along the shaped upper surface of the tubular bonnet,
    wherein the pivoting of the horizontal pin drive device causes the roller to roll along the upper surface of the tubular bonnet causing the upward and downward movement of the valve stem resulting in the opening and closing of the fluid inlet channel and the fluid outlet channel.

2. The fluid controller of claim 1, further comprising a cover attached to an end of the tubular bonnet opposite the valve body.

3. The fluid controller of claim 2, wherein the horizontal pin drive device further comprises a pivotal member movable about the axis of the horizontal pin and having an upper and lower end with the upper end extending through the cover.

4. The fluid controller of claim 1, wherein the valve stem has a diaphragm provided at the lower end.

5. The fluid controller of claim 4, wherein the fluid inlet channel of the valve body opens in the direction of the valve stem and has a seat defining an upward opening of the fluid inlet channel for receiving the diaphragm.

6. The fluid controller of claim 1, wherein the horizontal pin drive device further comprises a pivotal member movable about the axis of the horizontal pin and having an upper end and a lower end.

7. The fluid controller of claim 6, wherein the pivotal member has a roller support portion at the lower end, the roller support portion having two angled faces meeting at a lower end face.

8. The fluid controller of claim 7, wherein the roller support portion has a recess for accommodating the upper end of the valve stem.

9. The fluid controller of claim 6, wherein the pivotal member has a locking device comprising a stopper engagable with the upper end of the valve stem for locking the valve stem in a position.

10. The fluid controller of claim 6, wherein the pivotal member has an angle of pivotal movement of 20 degrees with respect to a vertical axis.

11. The fluid controller of claim 10, wherein at a maximum angle of pivotal movement the pivotal member is confined to a space defined by vertical planes extending vertically up from the valve body peripheral surface.

12. The fluid controller of claim 1, where in the shaped upper surface of the tubular bonnet is inclined about 10 degrees with respect to a horizontal plane.

13. The fluid controller of claim 1, wherein the elastic member is a coil spring.

14. A fluid controller comprising:
- a valve body for housing fluid channels, the valve body having,
  - a fluid inlet channel, and
  - a fluid outlet channel;
- a tubular bonnet with a lower end attached to the valve body and a shaped upper surface;
- a valve stem, having an upper end and a lower end, moveably disposed in the tubular bonnet and associated with the fluid inlet channel and the fluid outlet channel wherein upward and downward movement of the valve stem opens and closes the fluid inlet channel and the fluid outlet channel;
- an elastic member housed in the tubular bonnet for biasing the valve stem;
- a horizontal pin extending through the upper end of the valve stem and movable therewith;
- a horizontal pin drive device pivotally movable about an axis of the horizontal pin and having a pivotal member also pivotally movable about the axis of the horizontal pin, and
- a roller attached to the pivotal member for rolling along the shaped upper surface of the tubular bonnet,
- wherein the pivoting of the pivotal member causes the roller to roll along the upper surface of the tubular bonnet causing the upward and downward movement of the valve stem resulting in the opening and closing of the fluid inlet channel and the fluid outlet channel.

15. The fluid controller of claim 14, further comprising a cover attached to an end of the tubular bonnet opposite the valve body.

16. The fluid controller of claim 14, wherein the pivotal member has circular roller support portions at a lower end where the roller is attached.

17. The fluid controller of claim 16, wherein the roller support portion has a recess for accommodating the upper end of the valve stem.

18. The fluid controller of claim 16, which further comprises an engagement plate partially around the circular roller support portions.

19. The fluid controller of claim 14, where in the shaped upper surface of the tubular bonnet is inclined about 5 degrees with respect to a horizontal plane.

20. The fluid controller of claim 14, wherein the pivotal member has a locking device comprising a stopper engagable with the upper end of the valve stem for locking the valve stem in a position.

21. The fluid controller of claim 14, wherein the roller is an are open radial ball bearing rollers.

22. The fluid controller of claim 14, wherein the elastic member is a coil spring.

* * * * *